United States Patent
Donaldson

(10) Patent No.: US 8,448,128 B2
(45) Date of Patent: May 21, 2013

(54) POST-MERGER INTEGRATION SYSTEMS

(76) Inventor: Robert Donaldson, Duluth, GA (US)

( * ) Notice: Subject to any disclaimer, the term of this patent is extended or adjusted under 35 U.S.C. 154(b) by 1010 days.

(21) Appl. No.: 12/484,896

(22) Filed: Jun. 15, 2009

(65) Prior Publication Data

US 2009/0313598 A1 Dec. 17, 2009

Related U.S. Application Data

(60) Provisional application No. 61/061,176, filed on Jun. 13, 2008.

(51) Int. Cl.
*G06F 9/44* (2006.01)

(52) U.S. Cl.
USPC ............... 717/101; 717/102; 717/103

(58) Field of Classification Search .......... None
See application file for complete search history.

(56) References Cited

U.S. PATENT DOCUMENTS

| | | | |
|---|---|---|---|
| 7,703,071 B2 * | 4/2010 | Kuester et al. | 717/104 |
| 7,707,548 B2 * | 4/2010 | Hwang | 717/120 |
| 7,805,382 B2 * | 9/2010 | Rosen et al. | 705/321 |
| 2002/0120480 A1 | 8/2002 | Kroeger | |
| 2003/0018510 A1 * | 1/2003 | Sanches | 717/101 |
| 2004/0249659 A1 * | 12/2004 | Schwerin-Wenzel et al. | 717/101 |
| 2006/0059073 A1 * | 3/2006 | Walzak | 705/35 |
| 2008/0208649 A1 * | 8/2008 | Ficery et al. | 717/102 |
| 2008/0270581 A1 * | 10/2008 | Ficery et al. | 709/220 |

OTHER PUBLICATIONS

Martin Op't Land, Towards a Fast Enterprise Ontology Based Method for Post Merger Integration, 2009, ACM, 8 pages, <URL: http://delivery.acm.org/10.1145/1530000/1529336/p245-op_t_land.pdf>.*

Christian Braun, Integration of IT Service Management into Enterprise Architecture, 2007, ACM, 5 pages, <URL: http://delivery.acm.org/10.1145/1250000/1244267/p1215-braun.pdf>.*

* cited by examiner

*Primary Examiner* — Matt Kim
*Assistant Examiner* — Hua Lu
(74) *Attorney, Agent, or Firm* — Ryan A. Schneider, Esq.; Troutman Sanders LLP

(57) ABSTRACT

A stand-alone, menu-driven integration system software package is disclosed. The integration system can include a task library, a planning system, a projection system, a comparator system, and a reporting system. The task library can maintain a list of integration tasks for execution after closing of a merger between two or more organizations. Before closing, the planning system receives estimated date related to each task. After closing of the merger, execution of the integration tasks begins. The projection system can receive an action plan for each integration task. The action plans can be updated regularly, such that the projection system can maintain an accurate, current projection of results of the integrations tasks. The comparator system can monitor progression of the integration by comparing planned and desired data, receiving in the planning system, to projected data, received in the projection system. The reporting system can provide reports to monitor the integration.

18 Claims, 20 Drawing Sheets

| 410 Integration Activities | 420 | 430 Pre-Planning Program | 440 | 450 | 460 |
|---|---|---|---|---|---|
| Functional Groups | Subgroups | Integration Activity | Visible | Delete | Change Ordering |
| Sales and Marketing | Communications | Meet with Staff | ☐ | ☐ | Before |
| | | Staffing Analysis | ☐ | ☐ | Before |
| | | Company Name | ☐ | ☐ | Before |
| | | Logo | ☐ | ☐ | Before |
| | | Customer Announcements | ☐ | ☐ | Before |
| | | Sales Group Unity Meeting | ☐ | ☐ | Before |
| | | Stationary | ☐ | ☐ | Before |
| | | Notify Customers of Any Changes | ☐ | ☐ | Before |
| | 470 | | | | |
| | Market Planning and Assessments | Sales by Region | ☐ | ☐ | Before |
| | | Sales by Customer | ☐ | ☐ | Before |
| | | SWOT Analysis | ☐ | ☐ | Before |
| | | Competitive Audit | ☐ | ☐ | Before |
| | | Market Share analysis | ☐ | ☐ | Before |
| | | Annual Sales/Marketing Plan | ☐ | ☐ | Before |
| | | Strategic Plan | ☐ | ☐ | Before |
| | Product | Product Line Positioning/Rationalization | ☐ | ☐ | Before |
| | | Salesperson Cross Training of Products | ☐ | ☐ | Before |
| | | MRP Training | ☐ | ☐ | Before |
| | | Order Entry | ☐ | ☐ | Before |
| | | Sales Forecasting | ☐ | ☐ | Before |
| | | Indentify Customer Safety Stock Level | ☐ | ☐ | Before |
| | | Customer Design Review | ☐ | ☐ | Before |
| | | Product Development Programs | ☐ | ☐ | Before |
| | | Product Development Justification | ☐ | ☐ | Before |
| | | Assign Catalog Numbers | ☐ | ☐ | Before |
| | | Product Labelling | ☐ | ☐ | Before |
| | | Design Packaging | ☐ | ☐ | Before |
| | | Trademarks | ☐ | ☐ | Before |

Fig. 4

Sales and Marketing

Communications
Meet with Staff
Staffing Analysis
Company Name
Logo
Customer Announcements
Sales Group Unity Meeting
Stationary
Notify Customers of Any Changes

Market Planning and Assessments
Sales by Region
Sales by Customer
SWOT Analysis
Competitive Audit
Market Share analysis
Annual Sales/Marketing Plan
Strategic Plan

Product
Product Line Positioning/Rationalization
Salesperson Cross Training of Products
MRP Training
Order Entry
Sales Forecasting
Indentify Customer Safety Stock Level
Customer Design Review
Product Development Programs
Product Development Justification
Assign Catalog Numbers
Product Labelling
Design Packaging
Trademarks

Promotions
Website Development/Linkage

Fig. 6

PMI Link Edit

Staffing Analysis

| Question | Answer |
|---|---|
| Current status at ABC? | Fully staffed at optimum level - 14 |
| Current status at XYZ? | Fully staffed at optimum level - 12 |
| Are there any Synergies between ABC and XYZ? | Yes - numerous areas of duplication |
| What is the desired result you would like? | Reduce personnel by 4 |
| Will the action impact Orders (+ or -)? | 0 |
| Will the action impact Sales Revenue (+ or -)? | 0 |
| Will the action impact Cost of Goods Sold (+ or -)? | 0 |
| Will the action impact R & D expenses (+ or -)? | 0 |
| Will the action impact Selling/Marketing expenses (+ or -)? | -400 |
| Will the action impact Administrative expenses (+ or -)? | 0 |

[Apply Changes] [Apply and Goto Next] [Back]

Sales and Marketing

Integration Activities — Pre-Planning Program / Pre-Planning Impact

| Integration Activities | Pre-Planning Program | | | | Pre-Planning Impact | | | | | |
|---|---|---|---|---|---|---|---|---|---|---|
| | ABC | XYZ | Synergies of ABC and XYZ | Desired Result | Orders | Sales | COGS | R&D | S&M | Admin |
| Communications | | | | | | | | | | |
| Meet with Staff | Key members onboard | Only senior officers are aware | N/A | Dept meetings on first day | 0 | 0 | 0 | 0 | 0 | 0 |
| Staffing Analysis | Fully staffed at optimum level - 14 | Fully staffed at optimum level - 12 | Yes - numerous areas of duplication | Reduce personnel by 4 | 0 | 0 | 0 | 0 | -400 | 0 |
| Company Name | ABC | XYZ | Both well known in market | MAintain ABC as company name. Use XYZ for brand... | 0 | 0 | 0 | 0 | 20 | 0 |
| Logo | ABC+ | XYZ- | No, except for the + or - sign | Just use ABC logo | 0 | 0 | 0 | 0 | 10 | 0 |
| Customer Announcements | Nothing until closing | Nothing until closing | Similar customer base | Combine lists and have one mailing signed by bo... | 0 | 0 | 0 | 0 | 2 | 0 |
| Sales Group Unity Meeting | Last sales mtg - Oct 2008 | Last Sales Mtg - Aug 2008 | No | Have joint sales mtg on Mar 1-3 | 0 | 0 | 0 | 0 | 80 | 5 |
| Stationary | Have ABC | Have XYZ | No | Use ABC style ASAP - Discard remaining XYZ | 0 | 0 | 0 | 0 | 0 | 0 |
| Notify Customers of Any Changes | N/A | N/A | Both have good databases | AS changes occur, MarCom to work with Sales | 0 | 0 | 0 | 0 | 0 | 0 |
| Summary | | | | | 0 | 0 | 0 | 0 | -288 | 5 |

| Integration Activities | Pre-Planning Program | | | | Pre-Planning Impact | | | | | |
|---|---|---|---|---|---|---|---|---|---|---|
| | ABC | XYZ | Synergies of ABC and XYZ | Desired Result | Orders | Sales | COGS | R&D | S&M | Admin |
| Market Planning and Assessments | | | | | | | | | | |
| Sales by Region | Strong in East and South - Good International coverage | Strong in West - No International coverage | Yes - Complement strengths in US and Internatio... | | 0 | 0 | | | 0 | |

810

820

PMi Link Edit

Staffing Analysis

| | |
|---|---|
| This is the Desired Result | "Reduce personnel by 4" |
| What is the Action Plan? | Reduce five positions |
| When will this program Start? | 2009-02-01 |
| When will this program Conclude? | 2009-05-01 |
| Who is the Change Manager? | Customer Service Mngr |
| Status (completed/other)? | Waiting for final approvals |
| Will the action impact Orders (+ or -)? | 0 |
| Will the action impact Sales Revenue (+ or -)? | 0 |
| Will the action impact Cost of Goods Sold (+ or -)? | 0 |
| Will the action impact R & D expenses (+ or -)? | 0 |
| Will the action impact Selling/Marketing expenses (+ or -)? | -360 |
| Will the action impact Administrative expenses (+ or -)? | 0 |

[Apply Changes] [Apply and Goto Next] [Back]

Sales and Marketing

| Integration Activities | Pre-Planning Program | Action Plan Program | | | | | Action Plan Impact | | | | | |
|---|---|---|---|---|---|---|---|---|---|---|---|---|
| | Desired Result | Action Plan | Start Date | Completion Date | Change Manager | Status | Orders | Sales | COGS | R&D | S&M | Admin |
| Communications | | | | | | | | | | | | |
| Meet with Staff | Dept meetings on first day | Meet with staff the first day after closing | 01/02/2009 | 01/02/2009 | VP of Sales and Marketing | completed | 0 | 0 | 0 | 0 | 0 | 0 |
| Staffing Analysis | Reduce personnel by 4 | Reduce five positions | 02/01/2009 | 05/01/2009 | Customer Service Mngr | Waiting for final approvals | 0 | 0 | 0 | 0 | -360 | 0 |
| Company Name | MAintain ABC as company name. Use XYZ for branding of product only | Rename business to ABC after week 1 Maintain all brands | 01/07/2009 | 01/12/2009 | MarCom Mngr | Still being done | 0 | 0 | 0 | 0 | 0 | 0 |
| Logo | Just use ABC logo | | | | | | 0 | 0 | 0 | 0 | 0 | 0 |
| Customer Announcements | Combine lists and have one mailing signed by both Presidents on Day 1 | Combine lists and have mailing to all on Day 1 | 01/05/2009 | 01/06/2009 | VP Mktg and MarCom Mnger | Completed | 0 | 0 | 0 | 0 | 2 | 0 |
| Sales Group Unity Meeting | Have joint sales mtg on Mar 1-3 | Joint Sales Mtg including Mngt | 02/24/2009 | 02/26/2009 | VP of Sales | Completed | 0 | 0 | 0 | 0 | 95 | 0 |
| Stationary | Use ABC style ASAP - Discard remaining XYZ | Use ABC style as soon as possible - discard old supplies | 02/01/2009 | 03/01/2009 | MarCom Mngr | Completed | 0 | 0 | 0 | 0 | 0 | 6 |
| Notify Customers of Any Changes | AS changes occur, MarCom to work with Sales | Coordinate all changes with MarCom to send notince out ASAP | 01/05/2009 | 08/01/2009 | VP of Sales and Marcom Mngr | Ongoing | 0 | 0 | 0 | 0 | 0 | 0 |
| Summary | | | | | | | 0 | 0 | 0 | 0 | -263 | 6 |

1010 – Sales and Marketing
1020 – Pre-Planning Program
1030 – Status

Fig. 11

Sales and Marketing

Communications

| Integration Activities | Pre-Planning Program | | | | Pre-Planning Impact | | | | | | Action Plan Program | | |
|---|---|---|---|---|---|---|---|---|---|---|---|---|---|
| | ABC | XYZ | Synergies of ABC and XYZ | Desired Result | Orders | Sales | COGS | R&D | S&M | Admin | Action Plan | Start Date |
| Meet with Staff 1210 | Key members onboard | Only senior officers are aware | N/A | Dept meetings on first day | 0 | 0 | 0 | 0 | 0 | 0 | Meet with staff the first day after closing | 01/02/2009 |
| Staffing Analysis | Fully staffed at optimum level - 14 | Fully staffed at optimum level - 12 | Yes - numerous areas of duplication | Reduce personnel by 4 | 0 | 0 | 0 | 0 | -400 | 0 | Reduce five positions | 02/01/2009 |
| Company Name | ABC | XYZ | Both well known in market | Maintain ABC as company name. Use XYZ for brand... | 0 | 0 | 0 | 0 | 20 | 0 | Rename business to ABC after week 1. Maintain a... | 01/07/2009 |
| Logo 1210 | ABC+ | XYZ- | No, except for the + or - sign | Just use ABC logo | 0 | 0 | 0 | 0 | 10 | 0 | | |
| Customer Announcements | Nothing until closing | Nothing until closing | Similar customer base | Combine lists and have one mailing signed by bo... | 0 | 0 | 0 | 0 | 2 | 0 | Combine lists and have mailing to all on Day 1 | 01/05/2009 |
| Sales Group Unity Meeting | Last sales mtg - Oct 2008 | Last Sales Mtg - Aug 2008 | No | Have joint sales mtg on Mar 1-3 | 0 | 0 | 0 | 0 | 80 | 0 | Joint Sales Mtg including Mngt | 02/24/2009 |
| Stationary | Have ABC | Have XYZ | No | Use ABC style ASAP - Discard remaining XYZ | 0 | 0 | 0 | 0 | 0 | 5 | Use ABC style as soon as possible - discard old... | 02/01/2009 |
| Notify Customers of Any Changes | N/A | N/A | Both have good databases | AS changes occur, MarCom to work with Sales | 0 | 0 | 0 | 0 | 0 | 0 | Coordinate all changes with MarCom to send noti... | 01/05/2009 |
| Summary | | | | | 0 | 0 | 0 | 0 | -288 | 5 | | |

Market Planning and Assessments

| Integration Activities | Pre-Planning Program | | | | Pre-Planning Impact | | | | | | Action Plan Program | | |
|---|---|---|---|---|---|---|---|---|---|---|---|---|---|
| | ABC | XYZ | Synergies of ABC and XYZ | Desired Result | Orders | Sales | COGS | R&D | S&M | Admin | Action Plan | Start Date |
| Sales by Region | Strong in East and South - Good International coverage | Strong in West - No International coverage | Yes - Complement strengths in US and Internatio... | | 0 | 0 | 0 | 0 | 0 | 0 | aa | 01/01/2009 |
| Sales by Customer | See attached customer forecasts | See attached customer forecasts | Yes in some territories | | 70 | 70 | 35 | 0 | 0 | 0 | | |
| SWOT Analysis | see attached | see attached | Strong sales, poor R & D | Build on Sales and strengthen combined R & D to.. | 0 | 0 | 0 | 0 | 0 | 0 | Focus new activities on company strengths | 03/01/2009 |
| Competitive Audit | see attached | see attached | yes - complete market coverage | | 150 | 150 | 90 | 0 | 0 | 0 | | |

Action Plan Program / Action Plan Impact / Financial Impact Summary

| | S&M | Admin | Action Plan | Start Date | Completion Date | Change Manager | Status | Orders | Sales | COGS | R&D | S&M | Admin | Orders | Sales | COGS | R&D | S&M | Admin |
|---|---|---|---|---|---|---|---|---|---|---|---|---|---|---|---|---|---|---|---|
| | 0 | 0 | Meet with staff the first day after closing | 01/02/2009 | 01/02/2009 | VP of Sales and Marketing | completed | 0 | 0 | 0 | 0 | 0 | 0 | 0 | 0 | 0 | 0 | 0 | 0 |
| | -400 | 0 | Reduce five positions | 02/01/2009 | 05/01/2009 | Customer Service Mngr | Waiting for final approvals | 0 | 0 | 0 | 0 | -360 | 0 | 0 | 0 | 0 | 0 | 40 | 0 |
| | 20 | 0 | Rename business to ABC after week 1: Maintain a... | 01/07/2009 | 01/12/2009 | MarCom Mngr | Still being done | 0 | 0 | 0 | 0 | 0 | 0 | 0 | 0 | 0 | 0 | -20 | 0 |
| | 10 | 0 | | | | | | 0 | 0 | 0 | 0 | 0 | 0 | 0 | 0 | 0 | 0 | -10 | 0 |
| | 2 | 0 | Combine lists and have mailing to all on Day 1 | 01/05/2009 | 01/16/2009 | VP Mktg and MarCom Mngr | Completed | 0 | 0 | 0 | 0 | 2 | 0 | 0 | 0 | 0 | 0 | 0 | 0 |
| | 80 | 0 | Joint Sales Mtg including Mngt | 02/24/2009 | 02/26/2009 | VP of Sales | Completed | 0 | 0 | 0 | 0 | 95 | 0 | 0 | 0 | 0 | 0 | 15 | 0 |
| | 0 | 5 | Use ABC style as soon as possible - discard old... | 02/01/2009 | 03/01/2009 | MarCom Mngr | Completed | 0 | 0 | 0 | 0 | 0 | 6 | 0 | 0 | 0 | 0 | 0 | 1 |
| | 0 | 0 | Coordinate all changes with MarCom to send noti... | 01/05/2009 | 08/01/2009 | VP of Sales and Marcom Mngr | Ongoing | 0 | 0 | 0 | 0 | 0 | 0 | 0 | 0 | 0 | 0 | 0 | 0 |
| | -288 | 5 | | | | | | 0 | 0 | 0 | 0 | -263 | 6 | 0 | 0 | 0 | 0 | 25 | 1 |

| | S&M | Admin | Action Plan | Start Date | Completion Date | Change Manager | Status | Orders | Sales | COGS | R&D | S&M | Admin | Orders | Sales | COGS | R&D | S&M | Admin |
|---|---|---|---|---|---|---|---|---|---|---|---|---|---|---|---|---|---|---|---|
| | 0 | 0 | aa | 01/01/2009 | 11/30/2009 | aa | aa | 60 | 60 | 0 | 0 | 0 | 0 | 0 | -10 | -5 | 0 | 0 | 0 |
| | 0 | 0 | | | | | | 0 | 0 | 0 | 0 | 0 | 0 | 0 | 0 | 0 | 0 | 0 | 0 |
| | 0 | 0 | Focus new activities on company strengths | 03/01/2009 | 08/01/2009 | Product Manager | Ongoing | 0 | 0 | 30 | 0 | 0 | 0 | -10 | 0 | 0 | 0 | 0 | 0 |
| | 0 | 0 | | | | | | 120 | 120 | 70 | 0 | 0 | 0 | -30 | -30 | -20 | 0 | 0 | 0 |

| P & L Comparator | Last Year | Year 1 - Before Acquisition | Year 1 - Plan | Year 1 - Projected | Plan vs. Last Year | Projected vs. Last Year | Projected vs. Plan |
|---|---|---|---|---|---|---|---|
| Orders | 76000 | 84000 | 85070 | 84780 | 111.9% | 111.6% | 99.7% |
| Sales | 76000 | 84000 | 85070 | 84830 | 111.9% | 111.6% | 99.7% |
| COGS | 65000 | 48500 | 45801 | 46621 | 70.5% | 71.7% | 101.8% |
| GP | 11000 | 35500 | 39269 | 38209 | 357% | 347.4% | 97.3% |
| GP% | 14.5% | 42.3% | 46.2% | 45% | 318.9% | 311.2% | 97.6% |
| R & D | 2400 | 2600 | 2630 | 2635 | 109.6% | 109.8% | 100.2% |
| Sell/Mktg | 11500 | 12000 | 12222 | 12059 | 106.3% | 104.9% | 98.7% |
| Admin | 6800 | 7100 | 6984 | 6995 | 102.7% | 102.9% | 100.2% |
| OP Exp | 20700 | 21700 | 21836 | 21689 | 105.5% | 104.8% | 99.3% |
| OE% | 27.2% | 25.8% | 25.7% | 25.6% | 94.2% | 93.9% | 99.6% |
| Op Profit | -9700 | 13800 | 17433 | 16520 | -179.7% | -170.3% | 94.8% |
| OP % | -12.8% | 16.4% | 20.5% | 19.5% | -160.6% | -152.6% | 95% |
| Assets | 50920 | 56280 | 56350 | 56350 | 110.7% | 110.7% | 100% |
| Inventory | 22800 | 25200 | 25400 | 26300 | 111.4% | 115.4% | 103.5% |
| Receivables | 18240 | 20160 | 19000 | 19250 | 104.2% | 105.5% | 101.3% |
| Payables | 9120 | 10080 | 9080 | 10050 | 99.6% | 110.2% | 110.7% |
| Capital Employed | 82840 | 91560 | 91670 | 91850 | 110.7% | 110.9% | 100.2% |
| Return % | -11.7% | 15.1% | 19% | 18% | -162.4% | -153.6% | 94.6% |
| Headcount | 670 | 685 | 620 | 640 | 92.5% | 95.5% | 103.2% |

Fig. 13

| P&L Compare Setup | ABC | | XYZ | |
| --- | --- | --- | --- | --- |
| | Last Year | Year 1 - Before Acquisition | Last Year | Year 1 - Before Acquisition |
| 1410 —— Orders | 58,000 | 61,000 | 18,000 | 23,000 |
| Sales | 58,000 | 61,000 | 18,000 | 23,000 |
| 1410 —— COGS | 45,000 | 36,000 | 10,000 | 12,500 |
| GP | 13,000 | 25,000 | 8,000 | 10,500 |
| 1410 —— GP% | 22.4% | 41% | 44.4% | 45.7% |
| R & D | 1,800 | 1,900 | 600 | 700 |
| Sell/Mktg | 8,000 | 8,000 | 3,500 | 4,000 |
| Admin | 5,000 | 5,000 | 1,800 | 2,100 |
| OP Exp | 14,800 | 14,900 | 5,900 | 6,800 |
| OE% | 25.5% | 24.4% | 32.8% | 29.6% |
| Op Profit | -1,800 | 10,100 | 2,100 | 3,700 |
| OP % | -3.1% | 16.6% | 11.7% | 16.1% |
| Assets | 38,860 | 40,870 | 12,060 | 15,410 |
| Inventory | 17,400 | 18,300 | 5,400 | 6,900 |
| Receivables | 13,920 | 14,640 | 4,320 | 5,520 |
| Payables | 6,960 | 7,320 | 2,160 | 2,760 |
| Capital Employed | 63,220 | 66,490 | 19,620 | 25,070 |
| Return % | -2.8% | 15.2% | 10.7% | 14.8% |
| Headcount | 525 | 530 | 145 | 155 |
| Sales Per Headcount | 110 | 115 | 124 | 148 |
| CapEx | 600 | 650 | 250 | 320 |
| Depreciation | 2,150 | 2,200 | 700 | 800 |
| Integration Costs | 0 | 0 | 0 | 0 |

Fig. 14

| Company/Merger Info | |
|---|---|
| Merger Name | ABC Integration Program |
| Company 1 | ABC |
| Company 2 | XYZ |
| Begin Date(YYYY-MM-DD) | 2009-01-06 |
| Completion Date Projected(YYYY-MM-DD) | 2009-08-30 |
| Completion Date Planned(YYYY-MM-DD) | 2009-07-30 |
| Change Company/Merger Info | |

Fig. 17

Edit User

| Login E-mail | Access Level | Name | Merger | Group | Actions |
|---|---|---|---|---|---|
| johndoe@abc.com | Super Admin | John Doe | ABC-XYZ Integration Program | | ✏ ✖ |
| albertjohnson@abc.com | User | Albert Johnson | ABC-XYZ Integration Program | Sales/Mktg Team | ✏ ✖ |
| jacobwilson@abc.com | User | Jacob Wilson | Calculations Test Merger | HR Team | ✏ ✖ |
| jenniferbooker@abc.com | Merger Admin | Jennifer Booker | Calculations Test Merger | | ✏ ✖ |
| patrickstevens@abc.com | Merger Admin | Patrick Stevens | Calculations Test Merger | | ✏ ✖ |
| jeffreylewis@abc.com | User | Jeffrey Lewis | ABC-XYZ Integration Program | Sales/Mktg Team | ✏ ✖ |
| sarahbiel@abc.com | Super Admin | Sarah Biel | Demo | Admin Set-up | ✏ ✖ |

Create New User

Name: [         ]

Merger: [Choose one: ▾]  Or enter new merger: [         ]

Login E-mail: [         ]

Password: [         ]

Phone: [         ]

Access Level: [Super Admin ▾]

Group: [Admin Set-up ▾]

[Add This User]

Fig. 18

Sr. Management

| Basic Perms | |
|---|---|
| Action Plan: | No Access ▼ |
| Admin Set-up: | Allow Access ▼ |
| Admin Table Edit: | Allow Access ▼ |
| Financial Impact: | No Access ▼ |
| Integration Activities: | No Access ▼ |
| KPI: | Allow Access ▼ |
| P&L Comparator: | Allow Access ▼ |
| PL Compare Edit: | Allow Access ▼ |
| PMI Link: | Allow Access ▼ |
| PMI Link Activities Order/View Rights: | Allow Access ▼ |
| PMI Link Edit: | Allow Access ▼ |
| Pre-Planning: | No Access ▼ |
| Project Management : | Allow Access ▼ |
| User Edit/Add: | Allow Access ▼ |

Update Permissions

Fig. 19

POST-MERGER INTEGRATION SYSTEMS

CROSS-REFERENCE TO RELATED APPLICATIONS

This application claims a benefit, under 35 U.S.C. §119(e), of U.S. Provisional Application Ser. No. 61/061,176, filed 13 Jun. 2008, the entire contents and substance of which is hereby incorporated by reference.

BACKGROUND

1. Field of the Invention

Various embodiments of the present invention relate to integration systems and, more particularly, to computer-based post-merger integration systems enabling efficient planning, tracking, and measuring of integration-related tasks.

2. Description of Related Art

To maximize the impact of merging two organizations together, a merger must be completed rapidly and must be totally inclusive of all of the different functional groups within the organization. A successful merger takes commitment from all management levels of the organization and a passion by management to succeed.

Senior management must set the goals and organize a leadership team to take ownership of the integration. The leadership team must collectively follow a systematic methodology that is standardized throughout all functional groups of the organization. As directed by the leadership team managers, all members of the organization must work towards completing the integration activities as scheduled. The current progress of all integration activities and key performance indicators must be constantly updated available to integration management. Progress must be carefully monitored throughout the integration program to assure all integration activities are addressed properly and the desired results of the integration are achieved.

Therefore, there is a need for a post-merger integration system that can offer small companies an affordable, do-it-yourself, stand-alone software package that provides beneficial systematic methodologies, planning templates, or measuring capabilities, or a combination thereof. In an exemplary embodiment, such an integration system is available to authorized users on-line and on demand. Such an integration system can optimize the success of merging two or more organizations together. It is to such an integration system that embodiments of the present invention are primarily directed.

SUMMARY

Briefly described, various embodiments of the present invention can be post-merger integration systems and methods for providing and operating same. The integration system can enable users to efficiently plan and manage integration of two or more organizations. According to an exemplary embodiment, a post-merger integration system can comprise a task library, a planning system, a projection system, a comparator system, and a reporting system.

The task library can comprise a library of integration tasks to be completed during the integration. The task library can be based on a library template or customized by an individual user. Each integration task can be assigned to a functional team for planning and execution of the task.

The pre-planning system can be configured to receive pre-planning data related to the tasks in the task library. In an exemplary embodiment, pre-planning data is submitted before closing of a merger between the two organizations. Accordingly, pre-planning data can consist of identified synergies and estimates to help the company establish desired results for the integration tasks. Among the pre-planning data can be data relating to pre-planned financial impacts of the tasks.

The projection system can receive action plan data relating to ongoing execution of the tasks. In an exemplary embodiment, the action plan data is entered after the merger closes, and is regularly updated. Accordingly, action plan data can represent current projections of end results of the tasks. Among the action plan data can be data relating to the status of each integration task and the projected financial impacts of the tasks.

The comparator system can compare the pre-planned financial impact data to the projected financial impact data. The comparator system can highlight any discrepancies and, as a result, alert management and team members of tasks that should be addressed.

The reporting system can provide one or more reports for monitoring the progress of the integration. In an exemplary embodiment, the reporting system can provide reports on demand. The reporting system can pull and consolidate data compiled from the task library, pre-planning system, and the projection system. Reports produced by the reporting system can provide management with assessment tools for managing the integration program.

These and other objects, features, and advantages of the integration systems and methods will become more apparent upon reading the following specification in conjunction with the accompanying drawing figures.

BRIEF DESCRIPTION OF THE FIGURES

FIG. 4 illustrates selection of tasks for inclusion in a task library of the integration system, according to an exemplary embodiment of the present invention.

FIG. 6 illustrates a portion of the task library associated with a single functional team, according to an exemplary embodiment of the present invention.

FIG. 7 illustrates a worksheet of a pre-planning system of the integration system, according to an exemplary embodiment of the present invention.

FIG. 8 illustrates a portion of a pre-planning report from the pre-planning system, according to an exemplary embodiment of the present invention.

FIG. 9 illustrates a worksheet of a projections system of the integration system, according to an exemplary embodiment of the present invention.

FIG. 10 illustrates a portion of an action plan report from the projection system, according to an exemplary embodiment of the present invention.

FIG. 11 illustrates a portion of a financial impact report from a comparator system of the integration system, according to an exemplary embodiment of the present invention.

FIGS. 12A-12B illustrate portions of a consolidated report of pre-planning data, action plan data, and financial impact data, according to an exemplary embodiment of the present invention.

FIG. 13 illustrates a portion of a profit and loss report according to an exemplary embodiment of the present invention.

FIG. 14 illustrates a set-up page of the profit and loss report, according to an exemplary embodiment of the present invention.

FIG. 17 illustrates a portion of the set-up page for receiving organization information, according to an exemplary embodiment of the present invention.

FIG. 18 illustrates a user registration management page of the integration system, according to an exemplary embodiment of the present invention.

FIG. 19 illustrates a security management page of the integration system, according to an exemplary embodiment of the present invention.

DETAILED DESCRIPTION

Figure 1:
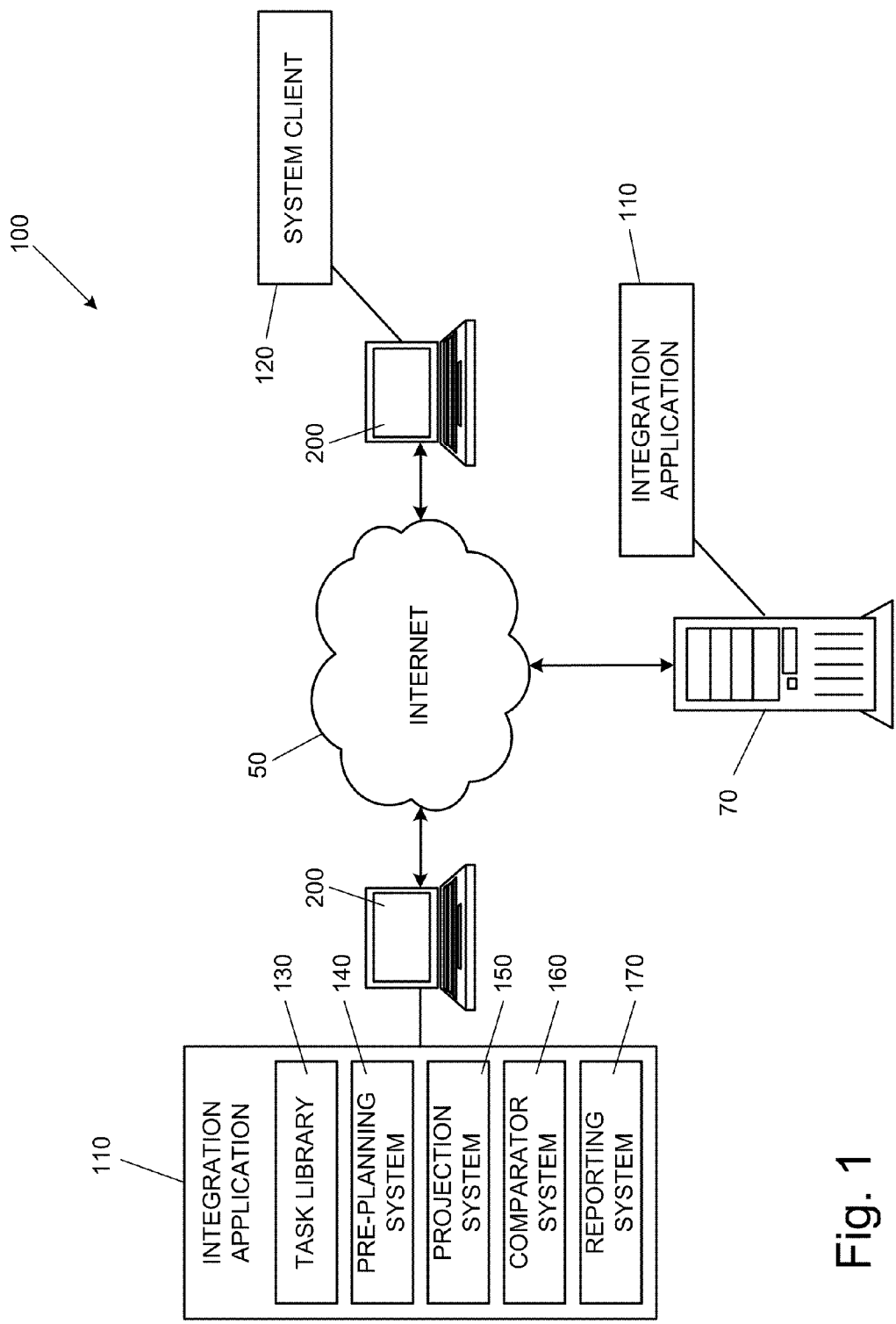
FIG. 1 illustrates an environment of an integration system, according to an exemplary embodiment of the present invention.

To facilitate an understanding of the principles and features of the present invention, various illustrative embodiments are explained below. Exemplary embodiments of the invention comprise integration systems and methods for tracking and/or measuring integration, particularly post-merger integration, of two or more organizations. In particular, embodiments of the systems and methods are described in the context of integrating two organizations involved in product sales. Embodiments of the invention, however, are not limited to this context. Rather, embodiments of the invention may be utilized to track integration of two or more organizations of various kinds. Further, some embodiments of the present invention can be used to plan and track various non-integration activities related to organizations.

The components described hereinafter as making up various elements of the invention are intended to be illustrative and not restrictive. Many suitable components that would perform the same or similar functions as components described herein are intended to be embraced within the scope of the integration systems and methods. Such other components not described herein may include, but are not limited to, for example, components developed after development of the invention.

The present integration system can provide a library of tasks for completion during the integration. The tasks can be selected and defined by management of one or more of the organizations to be integrated. Each task can be assigned to a functional group, such as a team, made up of entities belonging to one or more of the organizations. For each task, an assigned team can submit to the system planned, or desired, results relating to the task. In an exemplary embodiment of the system, planned results are submitted to the system before closing of a merger between the involved organizations.

After closing of the merger, execution of the tasks can begin. As execution of a task progresses, the system can receive updates as to how the task is progressing. As a result of such updates, the system can provide projected results for the task. The projected results may, but need not, match the planned results of the task. In an exemplary embodiment, the projected results of a task are based on the actual progression of the task, as opposed to pre-planning estimates.

As compared to conventional integration systems, the present integration system can have the following advantages:

The present system can provide a standardized, systematic methodology for users of the two or more organizations to manage a post-merger integration;

The present system can be a simple, intuitive system useable by small organizations;

The present system can be a stand-alone system that need not interconnect with a large mainframe ERP system;

The present system can drive team participation to discuss tasks and collectively reach agreements;

The present system can enable team members located anywhere in the world to meet together on-line, establish plans, and review tasks without physically being together;

The present system can provide templates for users to follow, so that users lacking experience in post-merger integrations can be led through the integration process;

The present system can provide a customizable library of integration activities;

The present system can provide various customizable reports;

The present system has the ability to change the terminology in all templates, reports and headings, so that the terminology can be consistent with that used within the organization;

The present system can provide consolidated synopses of integration planning and results; and The present system can provide complete, one-page summaries of the integration tasks for each functional group.

Referring now to the figures, wherein like reference numerals represent like parts throughout the views, various embodiments of integration systems and methods will be described in detail.

I. Environment of the Integration System

FIG. 1 illustrates an exemplary environment for operation of the integration system 100. As shown in FIG. 1, an environment of the integration system 100 can include a first computing device 200, a second computing device 200, a network 50, and a server assembly 70.

In some exemplary embodiments, the integrations system 100 can be executed locally on a single computing device 200. In such embodiments, the integration system 100 can be operable through an integration application 110. Alternatively, however, the integration system 100 can be operable over a network 50. In that case, the server assembly 70 can execute a server version of the integration application 110. The integration system 100 can then be accessible over the network 50 through an integration client 120 executed at the computing device 200.

Computing devices 200 used in or with the integration system 100 can be of various types. Examples of well known computing systems, environments, and/or configurations that may be suitable for use with the integration system 100 include personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
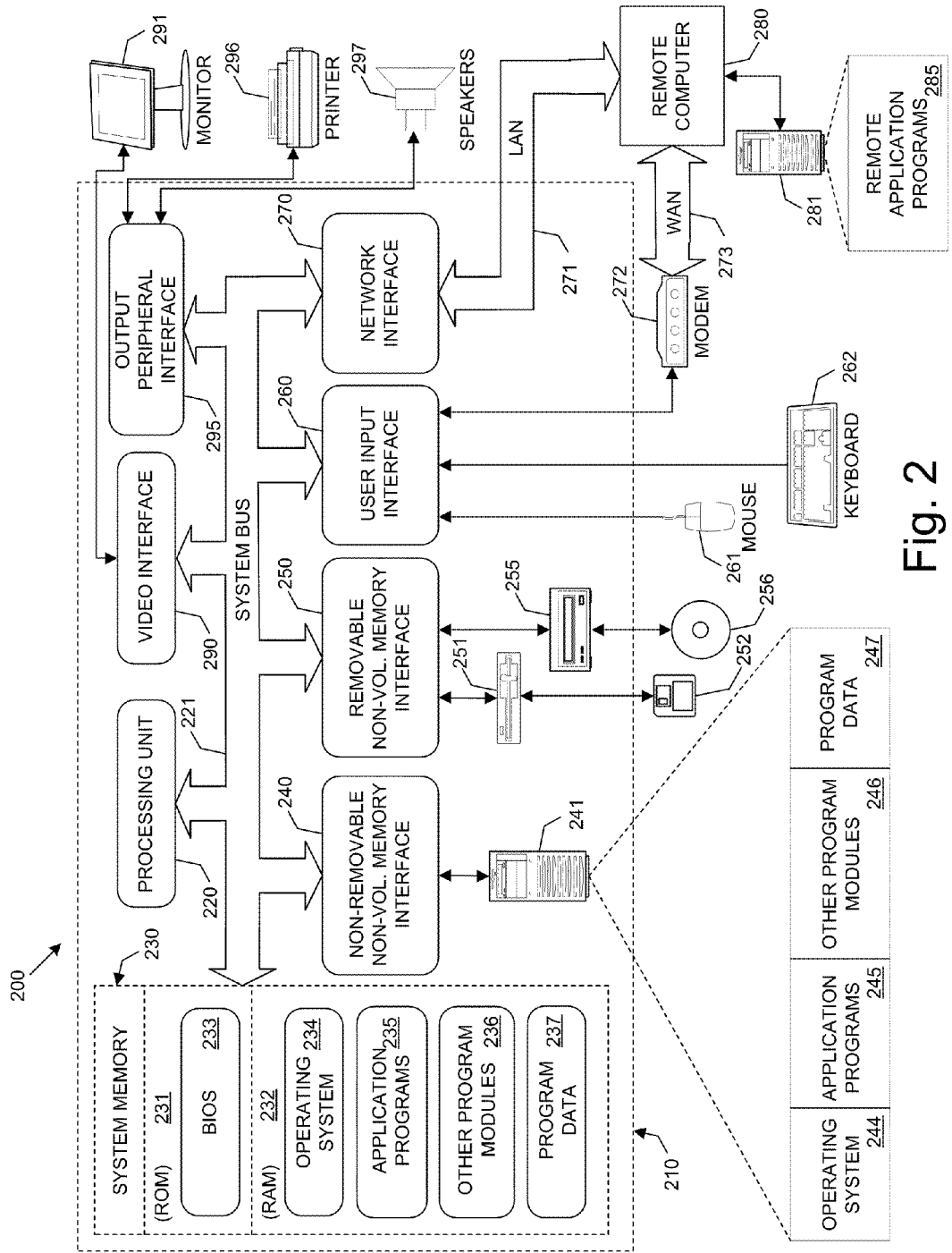
FIG. 2 illustrates a computing device for use with the integration system, according to an exemplary embodiment of the present invention.

FIG. 2 illustrates an example of a suitable computing device 200. The illustrated computing device 200 is only one example of a suitable computing environment and is not intended to suggest any limitation as to the scope of use or functionality of embodiments of the integration system 100.

Exemplary embodiments of the integration system 100 can be described in a general context of computer-executable instructions, such as one or more applications or program modules, stored on a computer-readable medium and executed by a computer processing unit. Generally, program modules can include routines, programs, objects, components, or data structures that perform particular tasks or implement particular abstract data types.

With reference to FIG. 2, components of the computing device 200 can comprise, without limitation, a processing unit 220 and a system memory 230. A system bus 221 can couple various system components including the system memory 230 to the processing unit 220. The system bus 221 can be any of several types of bus structures including a memory bus or memory controller, a peripheral bus, and a local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 200 can include a variety of computer readable media. Computer-readable media can be various available media accessible by the computing device 200, including both volatile and nonvolatile, removable and non-removable media. For example, and not limitation, computer-readable media may comprise computer storage media and communication media. Computer storage media includes both volatile and nonvolatile, removable and non-removable media implemented in any method or technology for storage of information such as computer readable instructions, data structures, program modules or other data. Computer storage media can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store data accessible by the computing device 200.

Communication media can typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For, and not limitation, communication media includes wired media such as a wired network or direct-wired connection, and wireless media such as acoustic, RF, infrared and other wireless media. Combinations of any of the above can also be included within the scope of computer readable media.

The system memory 230 can comprise computer storage media in the form of volatile and/or nonvolatile memory such as read only memory (ROM) 231 and random access memory (RAM) 232. A basic input/output system 233 (BIOS), containing the basic routines that help to transfer information between elements within the computing device 200, such as during start-up, can typically be stored in the ROM 231. The RAM 232 typically contains data and/or program modules that are immediately accessible to and/or presently in operation by the processing unit 220. For example, and not limitation, FIG. 2 illustrates operating system 234, application programs 235, other program modules 236, and program data 237.

The computing device 200 can also include other removable or non-removable, volatile or nonvolatile computer storage media. By way of example only, FIG. 2 illustrates a hard disk drive 241 that can read from or write to non-removable, nonvolatile magnetic media, a magnetic disk drive 251 for reading or writing to a non-volatile magnetic disk 252, and an optical disk drive 255 for reading or writing to a non-volatile optical disk 256, such as a CD ROM or other optical media. Other computer storage media that can be used in the exemplary operating environment can include magnetic tape cassettes, flash memory cards, digital versatile disks, digital video tape, solid state RAM, solid state ROM, and the like. The hard disk drive 241 can be connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above, and illustrated in FIG. 2, can provide storage of computer readable instructions, data structures, program modules and other data for the computing device 200. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237.

A web browser application program 235, or web client 224, can be stored on the hard disk drive 241 or other storage media. The web client 224 can comprise an application program 235 for requesting and rendering web pages 226, such as those created in Hypertext Markup Language ("HTML") or other types of markup languages. The web client 224 can be capable of executing client side objects, as well as scripts through the use of a scripting host. The scripting host executes program code expressed as scripts within the browser environment. Additionally, the web client 224 can execute web application programs 235, which can be embodied in web pages 226.

A user may enter commands and information into the computing device 200 through input devices such as a keyboard 262 and pointing device 261, commonly referred to as a mouse, trackball, or touch pad. Other input devices (not shown) may include a microphone, joystick, game pad, satellite dish, scanner, electronic white board, or the like. These and other input devices are often connected to the processing unit 220 through a user input interface 260 coupled to the system bus 221, but may be connected by other interface and bus structures, such as a parallel port, game port, or a universal serial bus (USB). A monitor 291 or other type of display device can also be connected to the system bus 221 via an interface, such as a video interface 290. In addition to the monitor, computers may also include other peripheral output devices such as speakers 297 and a printer 296. These can be connected through an output peripheral interface 295.

The computing device 200 can operate in a networked environment using logical connections to one or more remote computers, such as a remote computer 280. The remote computer 280 may be a personal computer, a server, a router, a network PC, a peer device, or other common network node, and can includes many or all of the elements described above relative to the computing device 200, including a memory storage device 281. The logical connections depicted in FIG.

2 include a local area network (LAN) 271 and a wide area network (WAN) 273, but can also include other networks.

When used in a LAN networking environment, the computing device 200 can be connected to the LAN 271 through a network interface or adapter 270. When used in a WAN networking environment, the computing device 200 can include a modem 272 or other means for establishing communications over the WAN 273, such as the internet. The modem 272, which can be internal or external, can be connected to the system bus 221 via the user input interface 260 or other appropriate mechanism. In a networked environment, program modules depicted relative to the computing device 200 can be stored in the remote memory storage device. For example, and not limitation, FIG. 2 illustrates remote application programs 285 as residing on memory device 281. It will be appreciated that the network connections shown are exemplary and other means of establishing a communications link between the computers can be used.

Referring back to FIG. 1, the server assembly 70 can comprise one or more computing devices adapted to provide services for the integration system 100. The server assembly 70 can have the same or similar components as those included in the computing device 200.

Portions of the computer-readable instructions on computer-readable storage media of the server assembly 70 can include, for example, instructions for implementing server-side processes of the integration application 110. Such server-side processes can include processing requests from the computing devices 200, as well as routing data between computing devices 200. Additionally, if the integration system 100 comprises one or more web application programs 235, the server assembly 70 can support a website, through which the computing devices 200 can access the integration system 100 via web clients 224.

When the integration system 100 is operated over the network 50, the server assembly 70 can be in communication with the each computing device 200 participating in the integration system 100. Accordingly, the computing devices 200 can be in communication with one another through the server assembly 70.

II. Details of the Integration System

Figure 3:
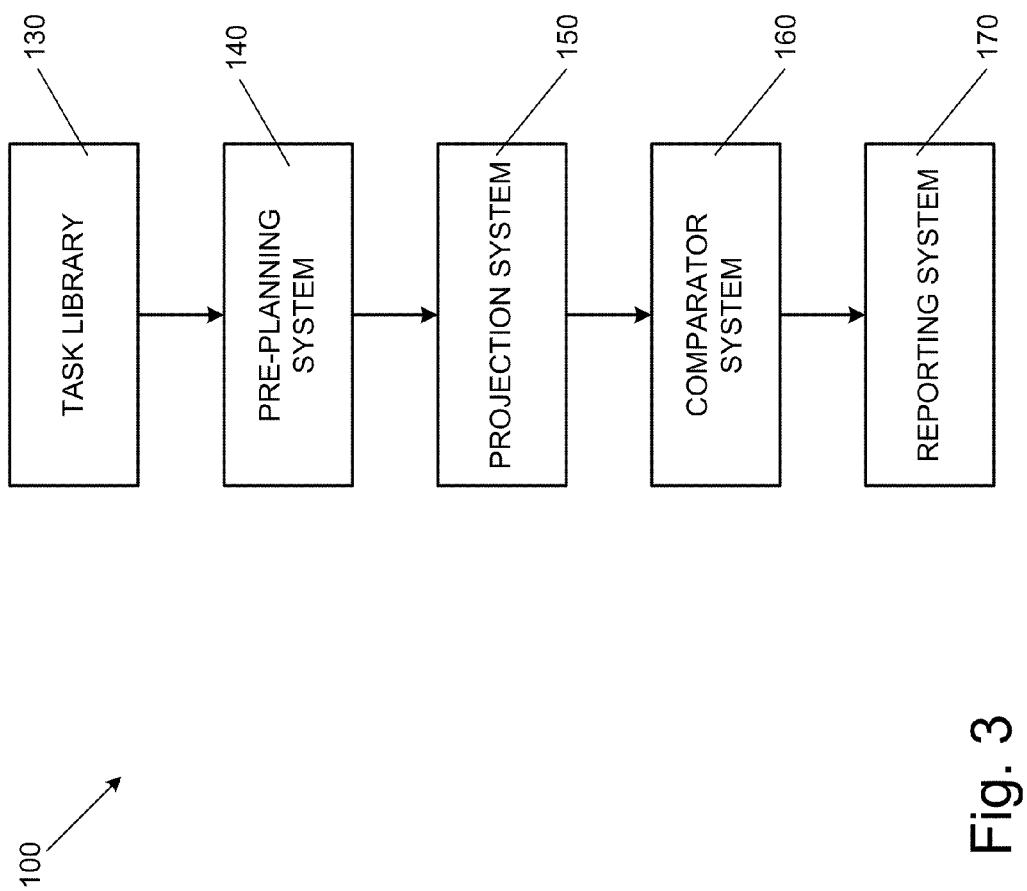
FIG. 3 illustrates various functional units of the integration system, according to an exemplary embodiment of the present invention.

FIG. 3 illustrates exemplary functional units of the integration system 100. As shown in FIG. 3, the integration system 100 can comprise a task library 130, a pre-planning system 140, a projection system 150, a comparator system 160, and a reporting system 170. These functional units, or sub-systems, can be accessible through the integration application 110, as shown in FIG. 1.

Use of the integration system 100 for an integration of two or more organizations can generally follow the arrows connecting the illustrated functional units in FIG. 3. As an initial step of using the integration system 100, the task library 130 can be set-up or confirmed by a management team. Before closing of a merger between the organizations, the pre-planning system 140 can be utilized to establish an initial integration plan based on tasks in the task library. After closing of the merger, the projection system 150 can be used and continuously updated to project an expect result of the integration. The comparator system 160 can compare data submitted to the pre-planning system to data submitted to the projections system. The comparator can enable the management team and others to monitor actual progress of the integration tasks as compared to the initial plan regarding such tasks. The reporting system 170 can produce reports from submitted and calculated data. In some exemplary embodiments of the reporting system 170, reports can textually and graphically describe task statuses and financial effects.

A. Task Library

The task library 130 can provide users an opportunity to select specific tasks, or integration activities, that are pertinent to the integration of two or more integrating organizations. Each task can be assigned to a functional group, or team. After assignment, each team can work independently or in combination with other teams to pre-plan the integration, produce an action plan, and monitor integration progress. Periodically, or upon request, the integration system 100 can produce reports so that the management team can track the progress and the financial impact of the integration tasks.

The integration application 110 can enable the management team or others to customize the tasks in the task library. In an exemplary use of the integration system 100, after the management team communicates its goals to the functional teams, each team selects and assigns tasks to itself based on such goals. FIG. 4 depicts an exemplary screenshot of a page of the integration application 110 for submitting changes to the task library 130. The third column 430 in FIG. 4 lists the current set of tasks, or integration activities, assigned to the functional team listed in the first column 410. In addition to being assigned to a team, each task can be categorized within a team's total set of assigned tasks. In FIG. 4, task categories are listed in the second column 420. As illustrated by, respectively, the fourth and fifth columns 440 and 450, the user can choose to make a task visible or to delete a task from the task library altogether. As illustrated by the sixth column 460, the user can also reorder the tasks within the applicable category of the task. Additionally, the user can add new tasks to the set of tasks assigned to a team by, for example, entering a new task name in a provided text box 470. FIG. 4 depicts only an exemplary screenshot for customizing the task library 130. Other embodiments of the integration system 100 can provide other manners of customizing the task library 130.

Figure 5:
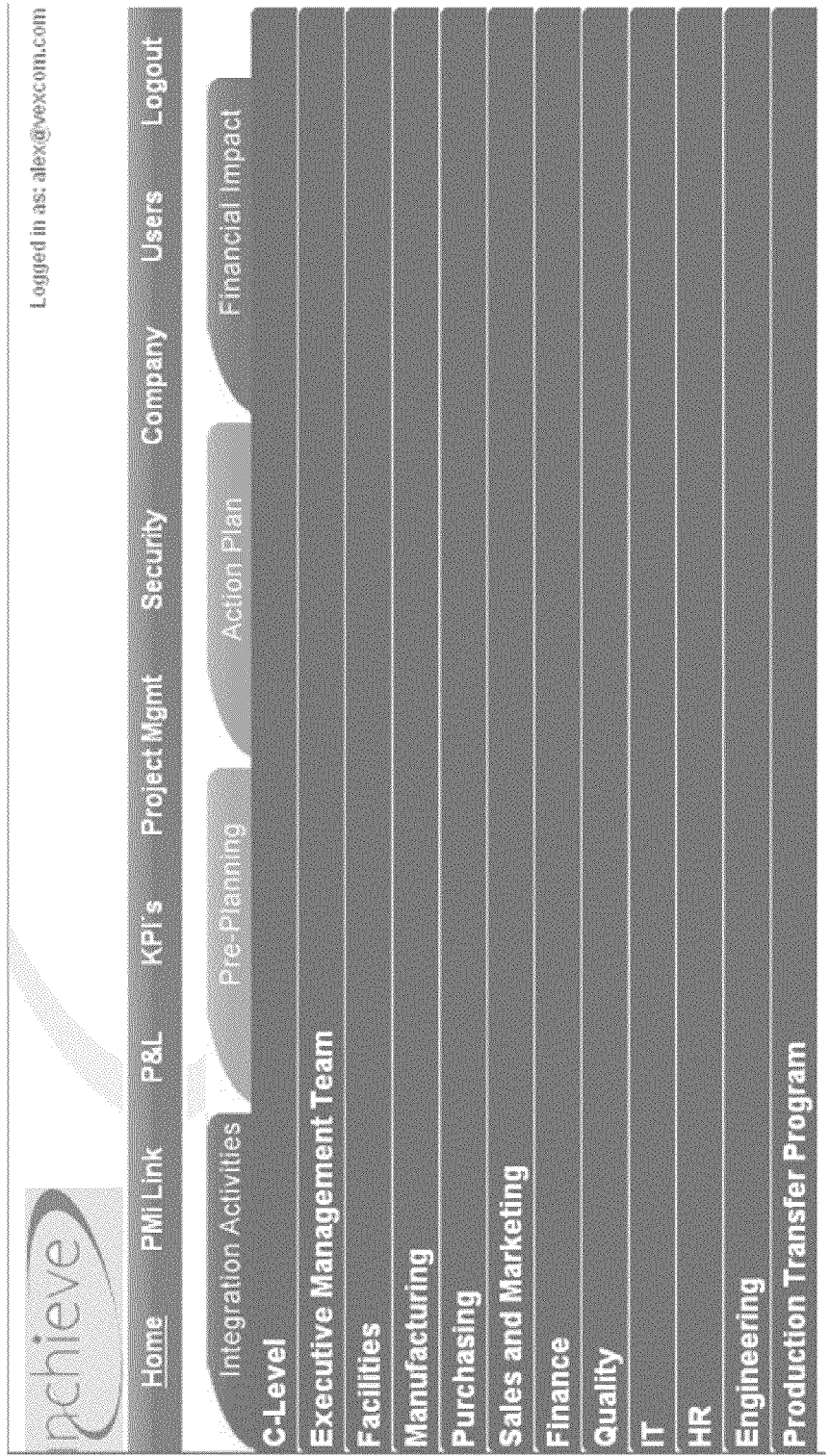
FIG. 5 illustrates a list of functional teams, according to an exemplary embodiment of the present invention.

FIG. 5 depicts a task library home page provided by an embodiment of the integration application 110. As shown in FIG. 5, the functional teams provided in the integration can include, among others, a C-Level (corporate level) team, Executive Management team, Facilities team, Manufacturing team, Purchasing team, Sales and Marketing team, Finance team, Quality team, IT (information technology) team, HR (human resources) team, Engineering team, and Production Transfer Program team. From this home page, the user can select a functional team to view tasks assigned to the selected team.

FIG. 6 illustrates an exemplary screenshot provided by the integration application 110. In the screenshot, tasks in the task library assigned to the Sales and Marketing team are viewable. Additionally, by selecting different functional teams, the user, if authorized, can view tasks assigned to other functional teams. The displayed tasks can be categorized for convenience. For example, as shown in FIG. 6, task categories for the Sales and Marketing team can include Communications, Market Planning and Assessments, Product, and Promotions. Other categories can be provided as well. In some embodiments, categories can determine responsibilities for sub-teams within teams.

B. Pre-Planning System

The pre-planning system 140 can be based, at least partially, on tasks in the task library 130. For example, the pre-planning system 140 can enable a user to enter pre-planning data related to each task in the task library 130. The pre-planning system 140 can present the user with one or more worksheets for entering such data. For the sake of simplicity, data for each individual task can be submitted through one or more worksheets dedicated to the individual task. In exemplary utilization of the integration system 100, a functional team assigned to the task completes the pre-planning worksheet(s) corresponding to the task.

FIG. 7 illustrates an exemplary pre-planning worksheet 700 for a single task of the integration system 100. As shown, for a selected task, the user can submit data related to the following: current status at the first organization (listed as organization ABC in FIG. 7); current status of the second organization (organization XYZ in FIG. 7); expected synergies between the organizations; desired result of the integration with respect to the task; and estimated financial impact of the integration. Submission and tracking of the expected synergies between the organizations can enable the organizations to leverage these synergies when forming action plans and carrying out the integration tasks. Submitted financial impact can be in terms of monetary value. For each task, an estimated financial impact can include, for example, impact on orders, sales, revenue, cost of goods, research and development, selling and marketing expenses, administrative expenses, or other relevant aspects of business conducted by the organizations.

In some embodiments of the integration system 100, the worksheets 700 for all tasks in the task library, or all tasks assigned to a single team, are the same or similar. Such similarity can support a systematic approach to planning the integration. Further, the similarity can enable provision of a simplistic, consolidated view of pre-planning data, as described below.

Pre-planning worksheets 700 for the various tasks of the integration system can be available over the network 50. Accordingly, users of the integration system 100 can connect online to collaboratively complete pre-planning worksheets and access pre-planning data. In some exemplary embodiments, remote users can collaboratively complete a single worksheet 700 in real time, such that a first remote user's changes are viewable to a second remote user even before submission of the worksheet 700. In other exemplary embodiments, however, the second remote user can only access data entered remotely into the worksheet 700 after it is affirmatively submitted by the first remote user.

An exemplary embodiment of the pre-planning system 140 can provide a consolidated view of all, or a subset of, submitted pre-planning data. FIG. 8 illustrates a screenshot of a consolidated pre-planning chart for a single functional team, specifically, the Sales and Marketing team. As illustrated in the first column 810 of the chart in FIG. 8, each integration task pre-selected by the functional team can be represented in the consolidated view. Such tasks can be sub-headed 820 by the categories into which the tasks fall. The categories can, but need not, correspond to sub-teams that will execute the tasks. One or more of the columns can correspond to data entry fields provided in the pre-planning worksheets 700 for the tasks. For example, as shown in FIG. 7, the pre-planning worksheets 700 can include data entry fields for synergies and desired results. Analogously, columns of the consolidated pre-planning chart can correspond to the synergies and desired results submitted in the worksheets 700. Accordingly, the consolidated view can provide a consolidated snapshot of pre-planning data submitted to the integration system 100.

Analogous pre-planning consolidated views can be provided for each functional team. Further, in some embodiments of the pre-planning system 140, a consolidated view can be provided for pre-planning data related to all or multiple functional teams.

In some embodiments of the integration application 110, various functional components of the integration system 100 can be color-coded to increase user friendliness of the application 110. In the chart of FIG. 8, for example, elements of the pre-planning system 100 appear in yellow.

C. Projection System and Establishment of Action Plans

After closing of a merger between the participating organizations, or after some other predetermined event, execution of the tasks can begin. Functional teams containing members of both organizations can then be free to openly discuss business and integration activities. As execution of each task proceeds, the applicable team can develop an action plan for the task. The action plan can be designed to transition the pre-plan into execution. Because the action plan is updateable, the action plan can take into account misconceptions, mistakes, and misunderstandings undesirably incorporated into the pre-planning data. As a result, the action plan represents an updateable, current projection of results of the integration.

Like the pre-planning system 140, the projection system 150 can be based at least partially on tasks in the task library 130, which correspond to tasks for which pre-planning data was received. The projection system 150 can present a user with one or more worksheets for entering data relating to an ongoing action plan. For the sake of simplicity, action plan data for each individual task can be submitted through one or more worksheets dedicated to the individual task. In exemplary utilization of the integration system 100, the functional team executing the task completes the action plan worksheet(s) corresponding to the task.

FIG. 9 illustrates an exemplary action plan worksheet 900 for a single task of the integration system 100. As shown, for a selected task, the user can submit data related to the following: goal of the action plan; start date of execution; conclusion date of execution; task manager; completion status; and estimated financial impact of the integration. For each task, an estimated impact can include impact on orders, sales, revenues, cost of goods, research and development, selling and marketing expenses, administrative expenses, or other relevant aspects of business conducted by the organizations. Impact can be entered in terms of monetary value. For reference, the worksheet 900 can display the desired result of the task, as entered in the pre-planning system 140. Submitted action plan data, such as date related to impacts on various aspects of data, can correspond to data submitted through the pre-planning system 140. Accordingly, comparisons can be drawn between pre-planning data and action plan data. In some embodiments of the integration system 100, the worksheets 900 for all tasks in the task library, or all tasks assigned to a single team, are the same or similar. Such similarity can support a systematic approach to planning the integration. Further, the similarity can enable provision of a simplistic, consolidated view of action plan data, as described below.

Action plan worksheets 900 for the various tasks of the integration system can be available over the network 50. Accordingly, users of the integration system 100 can connect online to collaboratively complete action plan worksheets 900 and access action plans and projected data. In some exemplary embodiments, remote users can collaboratively complete a single worksheet 900 in real time, such that a first remote user's changes are viewable to a second remote user even before submission of the worksheet 900. In other exemplary embodiments, however, the second remote user can only access data entered remotely into the worksheet 900 after it is affirmatively submitted by the first remote user.

In an exemplary use of the integration system 100, each functional team can meet regularly to discuss and, if necessary, update the action plans for the team's tasks. Regular updating of action plans can enable the integration system 100 to provide accurate reports reflective of the current state of the integration. Regular updating of the action plans can also encourage team interactions on a regular basis, which can be critical for the cultural and financial assimilation of individuals in the participating organizations.

An exemplary embodiment of the projection system 150 can provide a consolidated view of all, or a subset of, submitted action plan data. FIG. 10 illustrates a partial screenshot of a consolidated action plan chart for a single functional team, specifically, the Sales and Marketing team. As illustrated in the first column 1010 of the chart in FIG. 10, each integration task assigned to the functional team can be represented in the consolidated view. Such tasks can be sub-headed 1020 by the categories into which the tasks fall. One or more of the columns of the consolidated action plan chart can correspond to data entry fields provided in the action plan worksheets 900 for the tasks. For example, as shown in FIG. 9, the action plan worksheets 900 can include data entry fields for start date and change manager. Analogously, columns of the consolidated action plan chart can correspond to the start dates and change managers submitted in the worksheets 900. Accordingly, the consolidated view can provide a consolidated snapshot of action plan data submitted to the integration system 100.

Analogous action plan consolidated views can be provided for each functional team. Further, in some embodiments of the projection system 150, a consolidated view can be provided for action plan data related to all or multiple functional teams.

Color-coding can be implemented by the projection system 150. As shown in shading by FIG. 10, the action plan consolidated view can include a desired result of each task, as entered in the pre-planning system 140. As the desired result reflects pre-planning data, the desired result can be coded yellow, or whatever other color is assigned to pre-planning data. Action plan data can be coded another color, such as green. Additionally, a column of the consolidated view, or other report, corresponding to completion status 1030 can be color-coded based on the completion status. For example, if the user submits that a task has been completed, a cell corresponding to such task in the completion status column 1030 can be coded a first color, such as green. Alternatively, if a task is not completed, the corresponding cell in the completion status column 1030 can be coded a second color, such as red. As a result, users can immediately determine the progress of various tasks based on the consolidated view.

D. Comparator System for Financial Impact Comparisons

Figure 11:
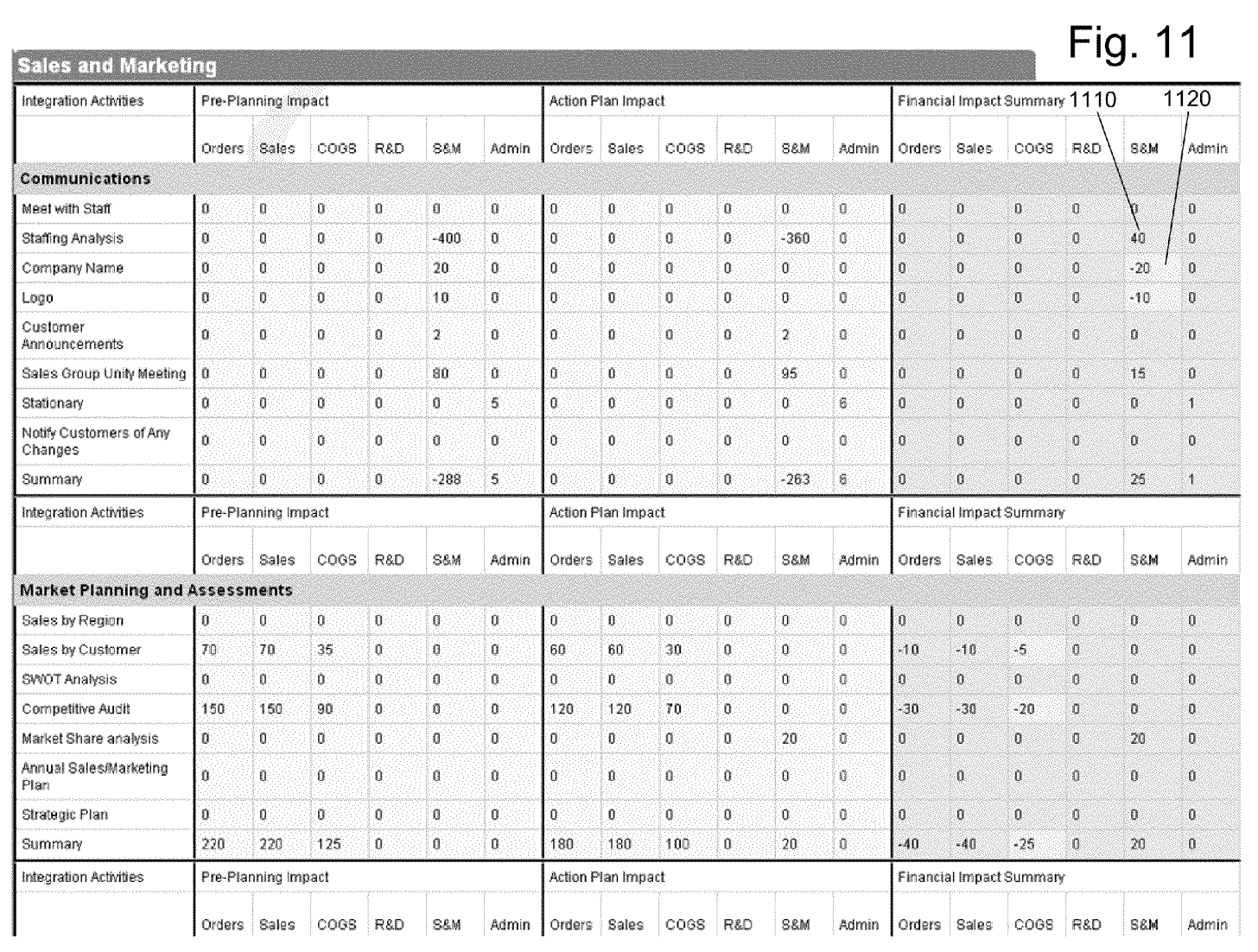

The comparator system 160 provides comparisons, or a financial impact summary, of pre-planning data and action plan data related to monetary impact of the various tasks. A chart of an exemplary set of, such comparisons is illustrated in FIG. 11. As shown in FIG. 11, the comparator system 160 can display all, or a portion of, the financial impact data submitted to the pre-planning system 140 and the projection system 150. As mentioned previously, the financial impact data entered in the projection system 150 can correspond to financial impact data entered in the pre-planning system 140. Accordingly, direct comparisons can be drawn between such financial impact data by, for example, subtracting the pre-planning financial impact numbers from the action plan financial impact numbers. The difference represents a difference between a pre-planned financial impact and a projected financial impact. The calculated differences can inform teams and managers of potential problems with current action plans.

As illustrated in shading by FIG. 11, color-coding can be used in the comparator system 160. Data submitted through the various other sub-systems of the integration system 100 can appear color-coded according to the colors corresponding to such sub-systems. Comparison data can be color-coded to correspond to the comparator system. In the chart of FIG. 11, such data is coded blue. Additionally, individual cells of the comparison data can be color-coded based on whether the action plan data represents an improvement or a declination as compared to the pre-planning data. For example, a first cell 1110 can be red because the action plan projects a worse result with respect to that cell 1110 than originally submitted to the pre-planning system 140. In contrast, a second cell 1120 can be green because the action plan projects a better result with respect to that cell 1120 than originally submitted to the pre-planning system. Such color-coding can occur automatically based on calculations comparing the pre-planning data and action plan data.

E. Additional Reporting

The reporting system 170 can provide reports for monitoring the integration. In addition to the above-described charts associated with the pre-planning, projection, and comparator systems 140, 150, and 160, the integration system 100 can provide various reports facilitating effective monitoring of the integration.

Although the reporting system 170 illustrated in the embodiment of FIG. 3 is being utilized after the projections system, reports can be generated by the reporting system 170 at various points throughout use of the integration system 100.

1. Complete Consolidated View

A first report can provide a complete consolidated view of data entered in the pre-planning and projection systems 140 and 150, as well as comparison data calculated by the comparator system 160. Such a report is depicted in FIGS. 12A-12B. As the complete consolidated report can be a large chart, when viewing the complete consolidated report on the screen of a computing device 200, a user will likely have to scroll right and down to view the entire report. FIGS. 12A-12B represent portions of single report. On a computer screen, the portion of the chart depicted in FIG. 12B would be appended to the rightmost edge of the portion of the chart depicted in FIGS. 12A-12B to form a single, large chart.

As shown in FIGS. 12A-12B, each task can be represented by a single row 1210 of the chart. Each row 1210 can include the data entered into the pre-planning worksheets 700 and action plan worksheets 900 for the corresponding task. Each row can further include comparison data relating to the pre-planned and projected financial impact of the corresponding task. The data in the chart can be color-coded as described previously.

Unique to this product, a complete consolidated report can be provided for each functional team or, alternatively, such a report can provided for all or a combination of teams. The report of FIGS. 12A-12B corresponds to data associated with the Sales and Marketing team.

2. Profit and Loss Report

A profit and loss ("P & L") report can also be provided by the integration system 100. An example of a P & L report is depicted in FIG. 13. For each of various business aspects, the report can detail P & L performance of the integration from the following perspectives: a total of performances of the separate organizations in the previous year (labeled "Last Year"); a total of planned performances of the separate organizations if no integration were to occur (labeled "year 1—Pre-Acquisition'); a pre-planning estimate of the Year 1 performance given the integration (labeled "Year 1—Plan"); a projected Year 1 performance given the integration (labeled "Year 1—Projected"); a percentage comparison of pre-planned performance versus last year's combined performance (labeled "Plan vs. Last Year"); a percentage comparison of projected performance versus last year's combined performance (labeled "Projected vs. Last Year"); and a percentage comparison of pre-planned performance versus projected performance (labeled "Projected vs. Plan").

Data populating the columns dedicated to the performances of the separate organizations in the previous year and the total of planned performances of the separate organizations if no integration were to occur can be calculated based on data submitted to the integration system during set-up or initialization of the integration system 100. FIG. 14 illustrates an exemplary set-up page for the P & L report. As shown in FIG. 14, for each of the organizations involved in the integration, data can be submitted corresponding to the organizations performance in the previous year and planned individual performance in Year 1. Such data can be carried over to the P & L report. Additionally, a user having requisite permissions can select which business aspects will appear in rows of the P & L report. Selected business aspects are listed in the first column 1410 of the P & L report set-up page.

3. Key Performance Indicators

Figure 15:
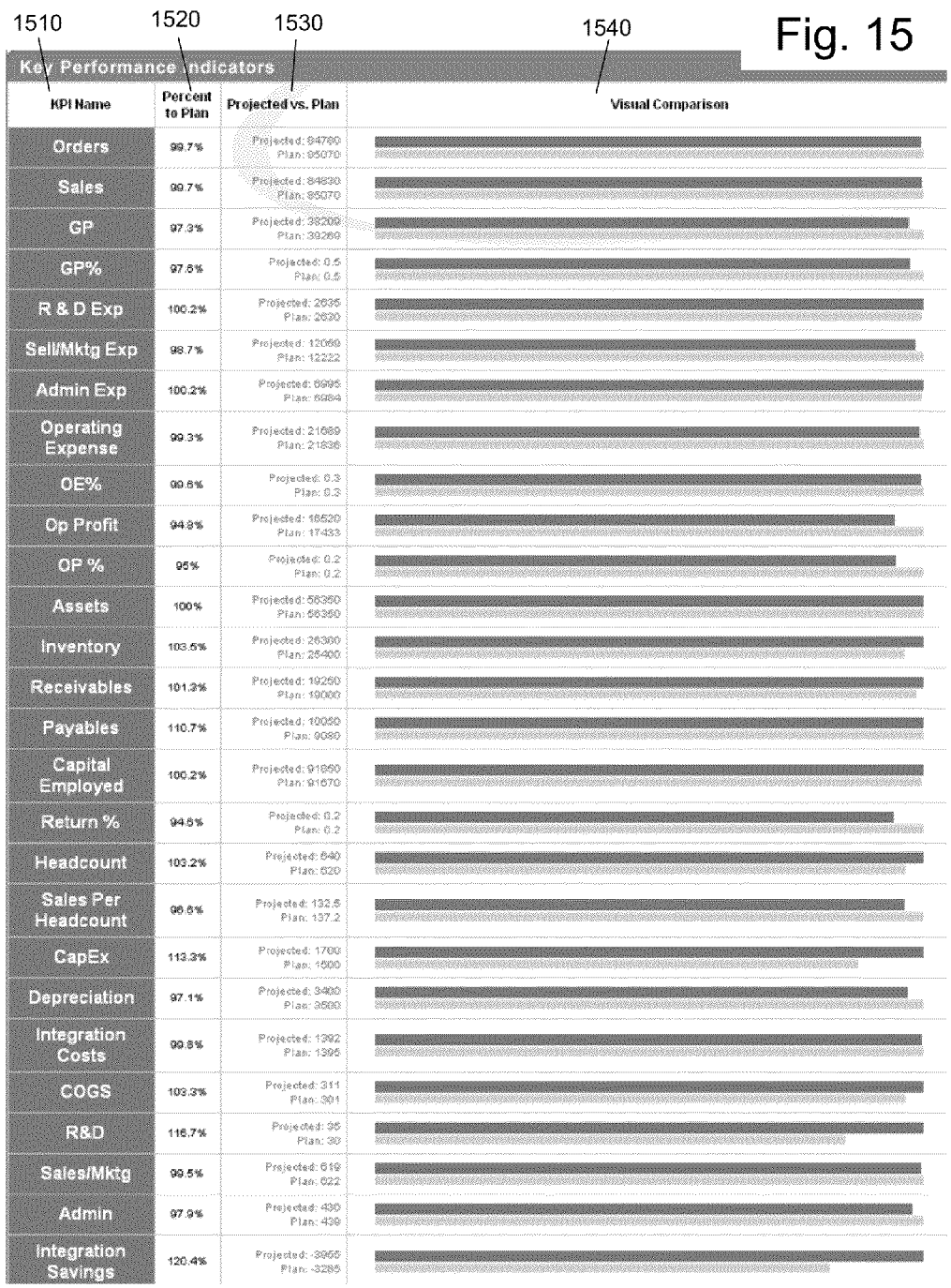
FIG. 15 illustrates a portion of a key performance indicators report, according to an exemplary embodiment of the present invention.

The integrations system 100 can additionally provide a Key Performance Indicator ("KPI") report, as illustrated in FIG. 15. As shown, the KPI report can provide a graphical representation of key performance indicators, but this is not required.

For various key performance indicators, which are listed in the first column 1510, pre-planning data can be compared to projected data. Comparison of such data can be presented as a percentage 1520, in absolute numbers 1530, and as a bar chart or other graphical representation 1540. As a result, a user of the report can immediately determine how the current progress of the integration compares to the pre-planned results of the integration. Further, additional key performance indicators not listed in the charts template can be added for enhanced customization.

A user having requisite permissions can select which key performance indicators will appear in rows of the KPI report.

4. Scheduling Report

Figure 16:
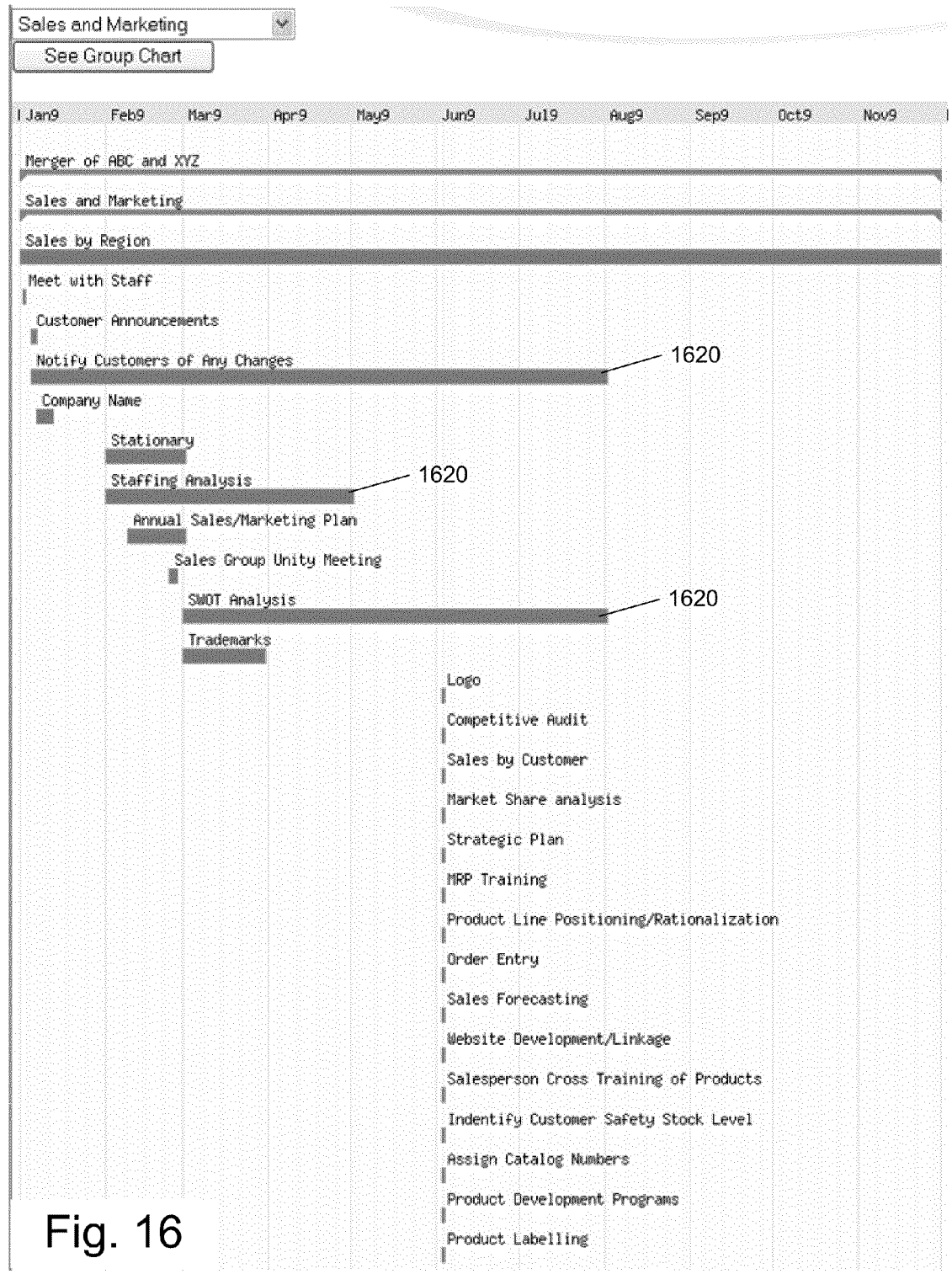
FIG. 16 illustrates a portion of a scheduling report, according to an exemplary embodiment of the present invention.

A scheduling report can also be provided by the integration system 100. FIG. 16 illustrates an exemplary scheduling report of the integration system. The scheduling report can provide a snapshot of the schedules of various integration tasks. As mentioned above, start and conclusion dates can be submitted for each task in the projection system 100. These dates can be carried over into the scheduling report, where, as shown, they can be presented in a consolidated format. Each row of the scheduling report can correspond to an integration task, and can include a timeline 1620 of the corresponding integration task, as shown.

A graphical scheduling report, such as that shown in FIG. 16, can be beneficial for effectively and quickly communicating schedules to a user. Despite the benefits of using a graphical scheduling report, a text-based scheduling report can also, or alternatively, be provided.

A scheduling report can be provided for each functional team. Alternatively, a scheduling report can provided for all or a combination of teams depending on customizations, selections, requisite permissions, or other factors. The report of FIG. 16 corresponds to task scheduling for the Sales and Marketing team.

F. Administrative Tools

Various administrative tools can be provided to customize the integration system 100 to a particular integration.

An administrator, or other person with requisite permissions, can initialize or update the integration system 100 by providing various information regarding the participating organizations. FIG. 17 illustrates an exemplary basic organization set-up page of the integration system 100. As shown in FIG. 17, the administrator can provide names of the organizations, a start date, a planned completion date, and a projected completion date. Such provided information can be automatically carried over to various other aspects of the integration system 100. For example, the names of the organizations can appear in various reports and worksheets of the integration system 100.

The administrator can manage user accounts of the integration system 100. An exemplary user management page of the integration system 100 is illustrated in FIG. 18. As shown in FIG. 18, the administrator can create new user accounts to add authorized users to the integration system 100. The administrator can also view account information and remove and edit user accounts. Additionally, the administrator can manage passwords and edit user account information.

An audit log can be provided to track input received from users of the integration system 100. The audit log can be available to select individuals, such as only administrators, and can provide additional security and traceability.

The administrator can establish security permissions for groups and individual users. FIG. 19 illustrates an exemplary security management page of the integration system 100. As shown in FIG. 19, the administrator can manage group access to various resources of the integration system 100. Although the illustrated page is associated with permissions of a senior management group, permissions of other groups can be managed by the administrator as well.

The administrator can apply a different set of permissions to each user group. For example, on a page such as that illustrated in FIG. 19, the administrator can apply broad permissions to the senior management group, such that members of the senior management group can access all worksheets and reports of the integration system 100. In contrast, sales associates of the organizations can be included in a sales user group, which can be given more limited permissions. For example, the sales user group can have access only to worksheets and reports associated with the Sales and Marketing team. The administrator can manage groups by adding users to groups and removing users from groups. Addition to a group, or removal from a group, can affect a user's permissions.

In some exemplary embodiments, the administrator can establish access codes for various aspects of the integration system 100. An access code can enable access to aspects of the integration system 100 by one or more individuals without establishment of a user group. An access code can be distributed to personnel to whom the administrator desires to provide the accessibility associated with the access code. Access codes can be used in various ways. For example, if a user of the integration system 100 attempts to access an aspect of the integration system 100 to which his user account does not have access, the user can be prompted to enter an access code. If the entered access code corresponds to the requisite permissions for accessing the aspect of the integration system 100, the user will be granted access.

Additionally, to enable further customization of the integration system 100, the administrator can change terminology used throughout the integration system 100. For example, names of integration tasks can be changed, as well as names of functional teams, report headings, data field labels, and various other names, labels, and headings. In an exemplary embodiment, the administrator can customize the integration system 100 for use with various sets of integrating organizations.

III. Conclusion

Accordingly, the integration system 100 can track and plan integration of two or more organizations as described above.

While embodiments of the invention have been disclosed in some exemplary forms, many modifications, additions, and deletions can be made therein without departing from the spirit and scope of the invention and its equivalents, as set forth in the following claims.

What is claimed is:

1. A computer-implemented integration system comprising:
   a task library comprising tasks for completion during an integration of a first organization and a second organization;
   a planning system configured to receive estimated data related to the tasks during a first phase of the integration;
   a projection system configured to receive updates on progression of the tasks during a second phase of the integration;
   a computer processor configured to project results of each of the tasks given the received updates; and
   a comparator system for comparing the estimated data and the projected results, including determining a difference between an estimated financial impact of a selected task in the task library, wherein the estimated financial impact is calculated before the task is initiated, and a projected financial impact of the selected task, wherein the projected financial impact is calculated after the selected task is initiated and in progress, the comparator system further configured to display simultaneously on a display device the estimated financial impact of the selected task, the projected financial impact of the selected task, and a comparison between the estimated financial impact and the projected financial impact.

2. The system of claim 1, further comprising a customization module configured to modify the task library.

3. The system of claim 1, wherein each task in the task library is assigned to a functional team.

4. The system of claim 1, the planning system further configured to receive data to leverage an expected synergy between the first organization and the second organization with respect to the selected task in the task library.

5. The system of claim 1, the planning system further configured to receive a desired result of integrating the first organization with the second organization with respect to the selected task in the task library.

6. The system of claim 1, the projection system further configured to receive a completion status for the selected task in the task library.

7. The system of claim 1, the projection system further configured to receive an action plan related to the selected task in the task library.

8. The system of claim 7, wherein the projected financial impact of the selected task is based on one or more updates related to progression of the selected task according to the action plan.

9. A computer program product embodied in a non-transitory computer-readable medium, the computer program product comprising an algorithm adapted to effectuate a method for tracking integration of a first organization and a second organization, the method comprising:
   providing a task library comprising one or more tasks relating to integration of a first organization and a second organization;
   receiving desired result data related to a first task in the task library before execution of the first task begins;
   receiving projected result data related to ongoing execution of the first task;
   identifying discrepancies between the desired result data and the projected result data; and displaying simultaneously on a display device an estimated financial impact of the selected task, a projected financial impact of the selected task, and a comparison between the estimated financial impact and the projected financial impact.

10. The computer program product of claim 9, the method further comprising comparing the desired result data to the projected result data.

11. The computer program product of claim 9, the method further comprising displaying on a display screen a consolidated view of the received data, the consolidated view comprising the desired result data, the execution data, and the comparison data.

12. The computer program product of claim 9, the method further comprising displaying a color-coded completion status for a task in the task library.

13. The computer program product of claim 9, the method further comprising producing a profit and loss comparator report.

14. The computer program product of claim 9, the method further comprising producing a key performance indicators report.

15. An integration system embodied in one or more non-transitory computer-readable storage media, the integration system comprising:
   a task library for managing integration tasks;
   a planning system for receiving estimated financial impacts of the integration tasks before execution of the integration tasks begins;
   a projection system for receiving projected financial impacts of the integration tasks after execution of the integration tasks has begun; and
   a comparator system for highlighting inconsistencies between the projected financial impacts and the planned financial impacts of the integration tasks, including determining
   a difference between an estimated financial impact of a selected task in the task library, wherein the estimated financial impact is calculated before the task is initiated, and a projected financial impact of the selected task, wherein the projected financial impact is calculated after the selected task is initiated and in progress, the comparator system further configured to display simultaneously on a display device the estimated financial impact of the selected task, the projected financial impact of the selected task, and a comparison between the estimated financial impact and the projected financial impact.

16. The integration system of claim 15, the comparator system further configured to display the difference between the estimated financial impact and the projected financial impact for a selected task, wherein the displayed difference is automatically color-coded based on whether the projected financial impact is an improvement over the estimated financial impact.

17. The integration system of claim 15, the planning system providing a separate worksheet for submission of the projected financial impacts associated with each individual task.

18. The integration system of claim 15, wherein the estimated financial impact of the selected task and the projected financial impact of the selected task are simultaneously displayed by a display device of a computer.

* * * * *